Oct. 24, 1939. M. J. ULINE Re. 21,249

ICE CAN

Original Filed May 7, 1934

Inventor

M. J. ULINE

By Pattison, Muzzi & Pattison

Attorneys

Reissued Oct. 24, 1939

Re. 21,249

UNITED STATES PATENT OFFICE 21,249

ICE CAN

Migiel J. Uline, Washington, D. C.

Original No. 2,060,541, dated November 10, 1936, Serial No. 724,398, May 7, 1934. Application for reissue August 9, 1938, Serial No. 223,995

3 Claims. (Cl. 220—66)

This invention relates to certain new and useful improvements in ice cans employed in the manufacture of artificial ice.

The object of my invention is to increase the efficiency in freezing blocks of ice by producing a can which is so constructed that the time necessary for freezing water in the cans and removing the blocks of ice from the cans is reduced, thereby reducing the operating costs.

Another object of my invention is to provide a can which is so constructed that means is provided for gradually releasing the air trapped in the air pocket under the bottom of the can to prevent the formation of large bubbles in submerging the can either in a brine tank or a dip tank, thereby preventing the liquid in the tank from being splashed into the can by the agitation of the bubble in rising to the surface when the can is submerged.

Another object of my invention is to provide a can in which the air is quickly released as it is submerged so as to allow the brine to come directly in contact with the bottom of the can when submerged in a brine tank or to allow the hot water to come directly in contact with the bottom of the can when submerged in a dip tank whereby the time required to freeze the water in the can is reduced and the time required to melt the block of ice in the can is reduced, thereby saving the cost of producing blocks of artificial ice.

Another object of my invention is to provide a can which is so constructed that by releasing the air trapped in the air pockets under the bottom of the can, oxidation of zinc on the bottom of the can is prevented whereby the life of the can is greatly increased.

In manufacturing artificial ice in the majority of ice plants now in use, sheet metal cans are employed having bottoms which are raised which form air pockets when said cans are immersed in either the brine tank or the dip tank whereby said air forms an insulation to prevent the brine from coming directly in contact with the can or the water coming in direct contact with the can when in the dip tank, whereby the time required for freezing the water in the can is increased and the time required for melting the block is increased.

My improved construction of can also provides novel means for gradually releasing the air trapped in the pockets so that as the can is immersed in the liquid, the air gradually escapes so as to prevent the formation of any large bubbles which would agitate the liquid of the tank to such an extent that the liquid would splash into the can.

My improved construction of can also produces a saving of the ice as when a can of the ordinary construction containing a block of ice is immersed in a dip tank of hot water, the sides of the block melt before the bottom melts, thereby it requires a greater length of time to melt the block of ice within a can of the ordinary construction than it does with a can constructed in accordance with my invention.

Other and further objects and advantages of the invention will be hereinafter set forth and the novel features thereof defined by the appended claims.

Figure 1:
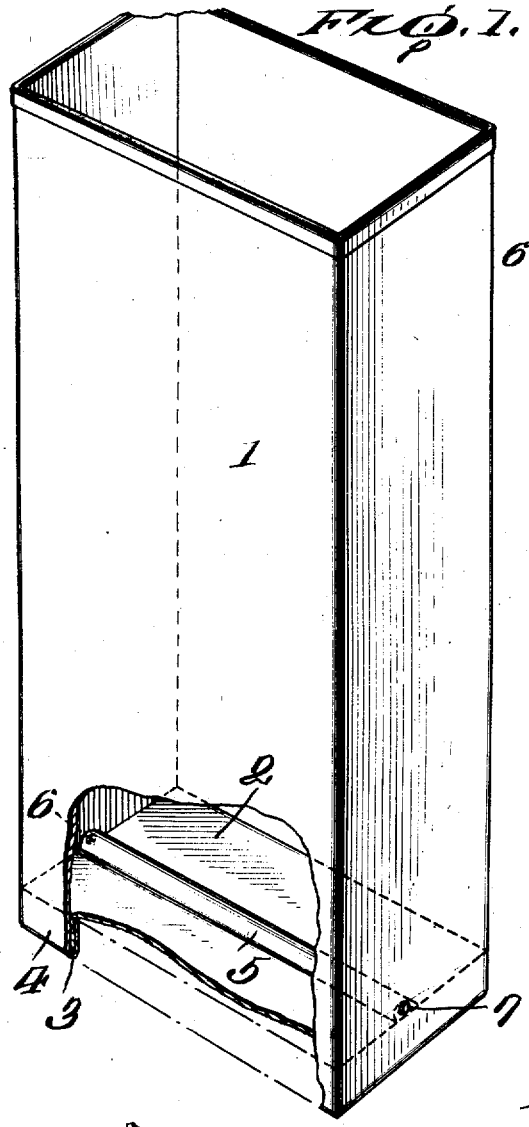
Fig. 1 is a perspective view of an ice can constructed in accordance with my invention, partly broken away, to show the bottom construction.
Figure 2:
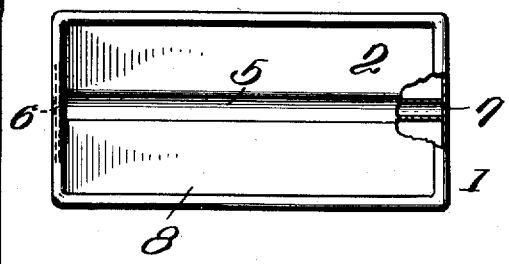
Fig. 2 is a top plan view, partly broken away to show the groove forming the vent.
Figure 3:
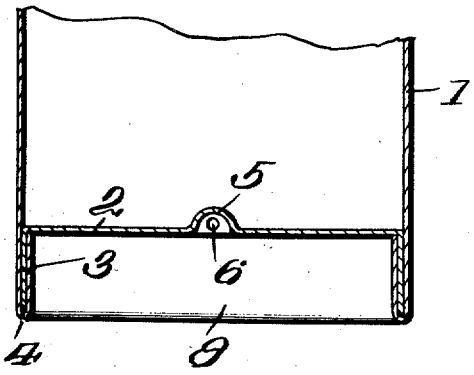
Fig. 3 is a detail transverse section through a portion of the can.
Figure 4:
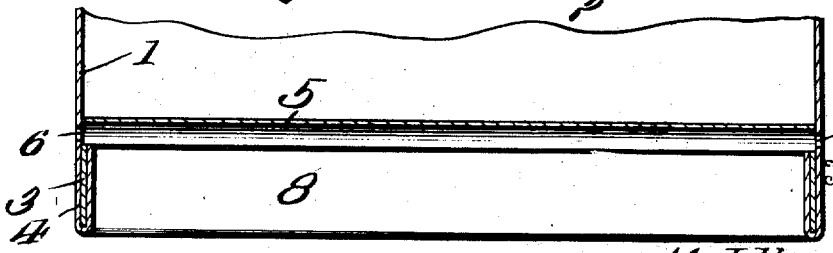
Fig. 4 is a detail longitudinal section through a portion of the can constructed in accordance with my invention.

My invention consists specifically in the formation of a bottom of a can which has a raised bottom forming an air pocket under the can and the object of my invention is to release the air trapped in this pocket.

In the drawing 1 indicates a rectangular can herein shown provided with a bottom 2 having a marginal depending flange 3 which is arranged within a loop 4 formed on the lower edge of the sides of the can, said bottom and sides being secured together in any suitable manner.

In the drawing I have shown the bottom welded within the loop of the sides of the can, but I wish it to be clearly understood that rivets can be used without departing from the spirit of my invention.

In forming the bottom of the can, a longitudinal groove 5 is formed therein by pressing the can upwardly by suitable die before the bottom is inserted within the walls of the can and this groove 5 registers with openings 6 and 7 formed in the ends of the can forming vent openings to allow air trapped under the bottom of the can when submerged in a liquid to escape.

In the construction of can as herein shown, it will be noted that by raising the bottom on the side walls of the can, a pocket 8 is formed under the bottom of the can, which pocket naturally contains air which is trapped therein when the can is immersed in liquid, which air gradually escapes so as to overcome the difficulties in using this type of can that now exist.

While in the drawing I have shown the bottom of a can provided with a groove so as to provide means for allowing practically all of the air to escape from the pocket, I am aware that a can provided with a bottom without a groove and with openings in its sides would allow the air to escape gradually so as to dispense with the insulation of air and therefore I do not wish to limit myself to the particular manner of forming the bottom of a can as my invention consists broadly in providing an ice can for the manufacture of artificial ice with a raised bottom which forms a pocket, which pocket is provided with vents for allowing the air trapped therein to escape gradually.

The bottom is secured within the can to form a water tight joint between the edges of the can and the bottom and the edge of the groove is secured to the inner walls of the can by welding or any other suitable means to form a water tight joint whereby a can is produced which has all of the advantages of the ordinary can now in use and yet is provided with means for venting the air trapped in the pocket under the bottom of the can to overcome the difficulties now existing with the use of such a construction of can in the manufacture of artificial ice.

In the manufacture of artificial ice as now carried on in the majority of ice plants throughout the country, a series of these cans are arranged in a unit and a crane is employed for handling the units of cans so as to carry the cans from place to place in the ice plant and after the cans have been filled with water, the crane carries the cans and lowers the same into a brine vat and as the cans are immersed in water, the air trapped in the pockets under the cans gradually escapes through the openings 6 and 7. After the blocks of ice have been frozen in the brine vat, they are raised by the crane and lowered into a dip tank of hot water to free the blocks of ice in order to allow the blocks to be removed therefrom and as the cans are arranged in the dip tank, the air trapped in the pockets is allowed to escape through the vents so as to allow the bottoms of the blocks of ice to thaw in order to allow the blocks to be readily removed.

By forming the vent holes of a predetermined size, the air can be vented from the pockets so that all danger of large bubbles being formed in rising to the surface is prevented.

I claim:

1. As a new article of manufacture, an ice can for the manufacture of artificial ice comprising a rectangular body having its lower edge turned inwardly and upwardly to form an open-ended loop surrounding the lower edge thereof, a bottom having a marginal depending flange fitting snugly within said body with the depending flange secured in said loop to form a pocket under substantially the entire area of the bottom of the can, said bottom being crimped transversely to form a transversely centrally disposed downwardly opening groove arranged in a plane above the ends of the upwardly turned ends of the body, the ends of the can above the upwardly turned ends being provided with vent openings registering with the groove formed in the bottom.

2. As a new article of manufacture, an ice can adapted to be immersed in a body of liquid for the manufacture of artificial ice, consisting of a rectangular body, a bottom secured therein and spaced from the lower edge thereof, the said body and bottom portions thereby forming a rectangularly shaped pocket beneath the bottom portion, a downwardly opening groove which extends completely across the said bottom, said groove being formed by bending the center portion of the bottom upwardly, the entire surface of the said groove being positioned above the said pocket and each of its ends registering with a vent opening, said openings consisting of apertures through opposed walls of the can.

3. As a new article of manufacture, an ice can adapted to be immersed in a body of liquid for the manufacture of artificial ice, consisting of a rectangular body having its lower edge turned inwardly and upwardly to form an open-ended loop, a bottom arranged within said body to form a pocket under the bottom, said bottom having a marginal depending flange which is secured in the said loop, a downwardly opening groove which extends completely across said bottom, said groove being formed by bending the central portion of the bottom upwardly, the entire surface of the said groove being positioned above the pocket and each of its ends registering with a vent opening, said openings consisting of apertures through the opposed walls of the can.

MIGIEL J. ULINE.